United States Patent [19]
Allen et al.

[11] 3,916,680
[45] Nov. 4, 1975

[54] ROLL TENSION MONITOR FOR SAW BLADE

[75] Inventors: Francis Edwin Allen, North Vancouver; Andrew Wilkinson Porter, Vancouver, both of Canada

[73] Assignee: Letson and Burpee Ltd., Vancouver, Canada

[22] Filed: May 28, 1974

[21] Appl. No.: 473,387

[30] Foreign Application Priority Data
May 31, 1973 United Kingdom............... 25944/73

[52] U.S. Cl..................................... 73/100; 73/159
[51] Int. Cl.².......................................... G01N 3/20
[58] Field of Search............. 73/88 R, 100, 159, 144

[56] References Cited
UNITED STATES PATENTS

| | | | |
|---|---|---|---|
| 2,347,454 | 4/1944 | Beckett | 73/88 R |
| 2,831,344 | 4/1958 | Karr et al. | 73/100 |

*Primary Examiner*—Jerry W. Myracle
*Attorney, Agent, or Firm*—Carver and Company

[57] ABSTRACT

Device for indicating roll tension or residual stress distribution in saw blade. Device has forming means for deforming selected length of saw into longitudinal curve of known geometry so that saw is bowed transversely across width thereof. Forming means has face datum and edge datum and selected length is located relative thereto. Sensing means adjacent saw face detects spacing of saw face from data. Visual display means cooperating with sensing means provides visual display of saw profile so that residual stress distribution can be assessed.

10 Claims, 8 Drawing Figures

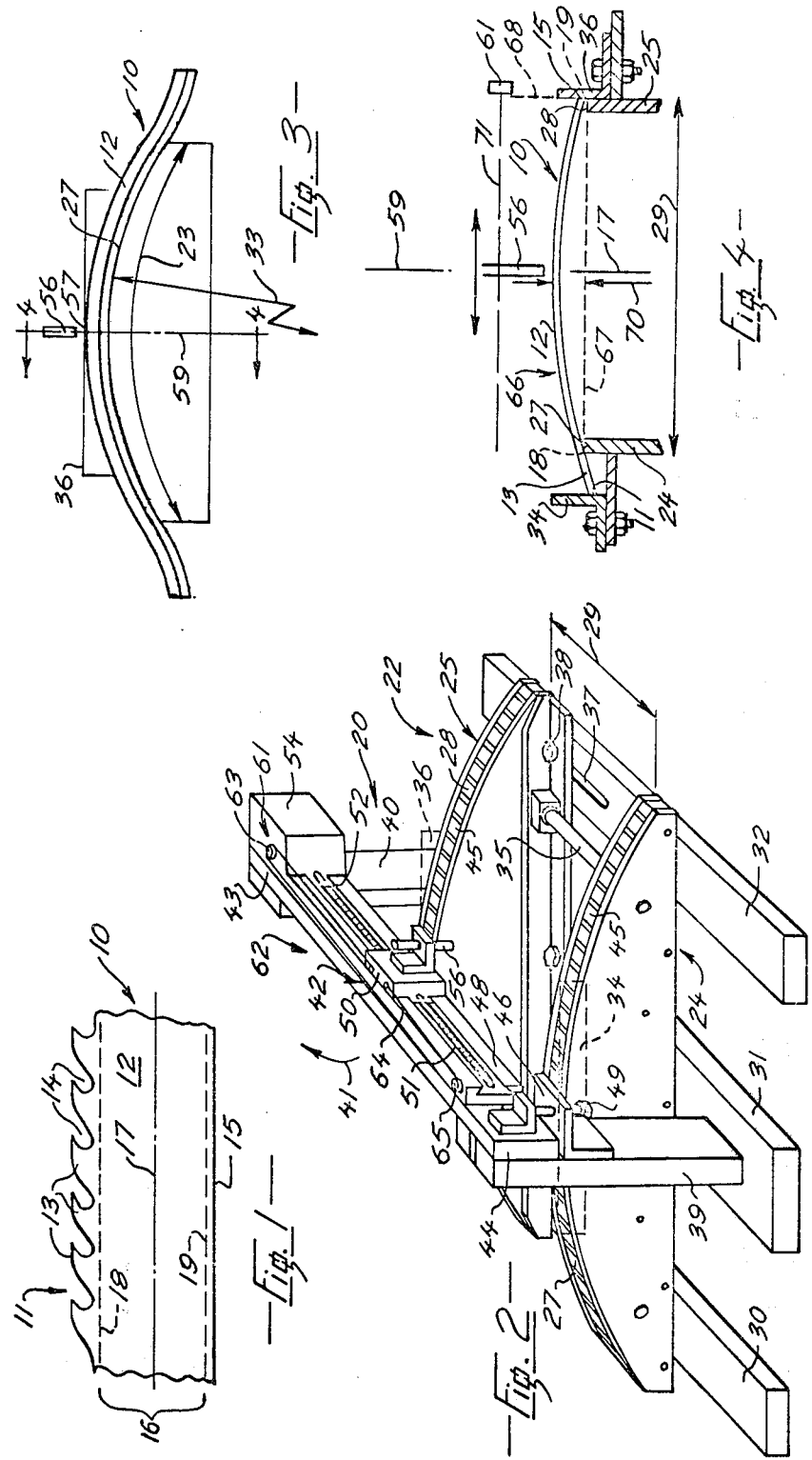

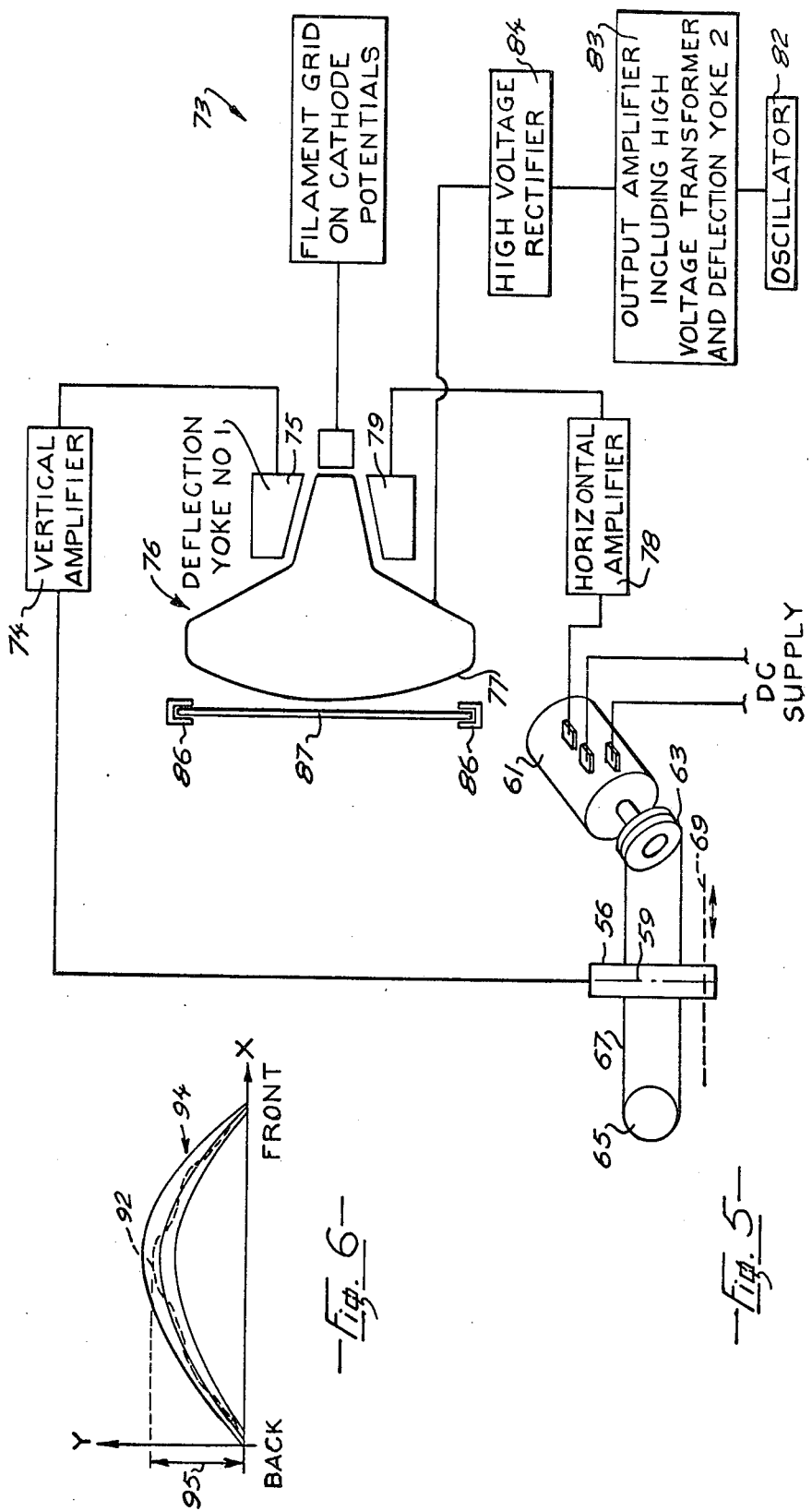

ROLL TENSION MONITOR FOR SAW BLADE

BACKGROUND OF THE INVENTION

1. Field of the Invention

The invention relates to a device for assessing residual stress distribution in a band or frame saw as used in the lumber industry, after the saw has been tensioned. The invention portrays by means of a visual display the "tension profile" of a roll tensioned saw blade.

2. Prior Art

It is well known in the art of saw filing that the performance of a band saw or a frame saw may be improved if the blade is first given treatment known in the trade as "tensioning". In essence, a band or frame saw is tensioned by expanding metal throughout the central portion of the saw, and to a lesser degree the back edge of the saw. The saw is stressed beyond its metallurgical elastic limit which results in a residual tensile stress in the outer edges of the saw and a residual compressive stress in the central portion. Hereinafter, tension, tensioning etc. refers to expansion of metal as above and not to tensile stress in the saw resulting from other causes such as force between wheels of a bandmill.

In band sawing it is also known that tensioning assists in maintaining central tracking of the saw on the wheels of the bandmill by substantially overcoming normal effect of "anticlastic curvature". When a bandsaw is bent around a wheel, anticlastic curvature tends to lift the two outer edges of the saw away from the wheel. The inner section of a tensioned saw is effectively stretched by the tensioning and this tends to counteract the normal result of edge lifting due to anticlastic curvature. With correct tensioning as above the blade travels or tracks more centrally relative to the wheel. Also when the tensioned saw is bent in an arc the saw assumes a transversely bowed cross section, which cross-sectional shape reflects residual stress distribution in the saw.

Tensioning was originally performed by hand hammering, but now this is being largely supplanted by the use of power driven stretcher rolls. Tensioning may also be performed by thermally heating sections of the blade using oxy-acetylene torches and/or similar heating devices. Herein, "roll tensioning" refers to all methods above.

For optimum sawing performance, tensioning or residual stress distribution in the saw blade must be properly assessed and controlled. In the past a saw filter assessed the tension in the saw by bending it in an arc within a plane containing the longitudinal axis of the saw, so that the saw assumed the transverse bow as above. A circle template or straight edge is then placed transversely across the saw blade and the deviation or spacing of the saw from the circle template or straight edge is visually assessed, giving an indication of stress distribution within the saw blade.

Deviation of the saw from the straight edge is known as "light slit" or "chord height". In general this deviation varies from zero in front and back edges of the saw to a maximum value in the central portion which may range from 0.005 inches to 0.100 inches, depending on the blade thickness, blade width, type of the curve into which the blade is formed and the amount and distribution of tension in the saw.

From the above description it can be seen that a considerable amount of skill and experience is required if a saw filer is to correctly assess the residual stress distribution in a blade using current techniques. With increasing use of thinner blades in saw mills it is becoming increasingly difficult for saw filers to properly prepare the blades so they may operate successfully under high tensile stresses without developing cracks in the tooth gullets.

SUMMARY OF THE INVENTION

The invention reduces difficulties of the prior art by providing a device which portrays on a visual electronic monitor a tension profile or distribution of residual stress in a band or frame saw blade.

The device according to the invention includes a forming means, a sensing means and a visual display means. The forming means holds a selected length of the saw in which roll tension is to be assessed, the length being deformed into a longitudinal curve of known geometry. Roll tension in the saw causes the selected length of the saw to be bowed transversely across the width thereof so that the face of saw has a bowed profile. The forming means has a face datum and an edge datum and the selected length of the saw is located relative to the data. The sensing means cooperates the face of the saw to detect at a position on the selected length of the saw spacing of the face of the saw relative to the face datum and the edge datum. The visual display means cooperates with the sensing means to provide a visual display of the profile of a portion of the selected length of the saw so that distribution of residual stress in the saw can be assessed from the visual display.

A detailed description following, related to drawings, gives exemplification of appratus according to the invention which, however, is capable of expression in structure other than that particularly described and illustrated.

DESCRIPTION OF THE DRAWINGS

FIG. 1 is a fragmented plan of a portion of a saw blade,

FIG. 2 is an isometric view of one example of the device according to the invention, some portions being removed, FIG. 3 is a diagrammatic side elevation of the device showing a portion of a saw blade in position relative to the device, FIG. 4 is a simplified diagrammatic transverse section on 4—4 of FIG. 3, curvature of the saw blade being exaggerated, FIG. 5 is a block schematic of an electrical embodiment of a display circuit in which signals from transducers are fed into an oscilloscope display means, FIG. 6 shows desired profiles of stress distribution on a transparancy and also a visual representation of the stress distribution as obtained on a display screen of the device.

DETAILED DISCLOSURE

FIG. 1

Figure 8:
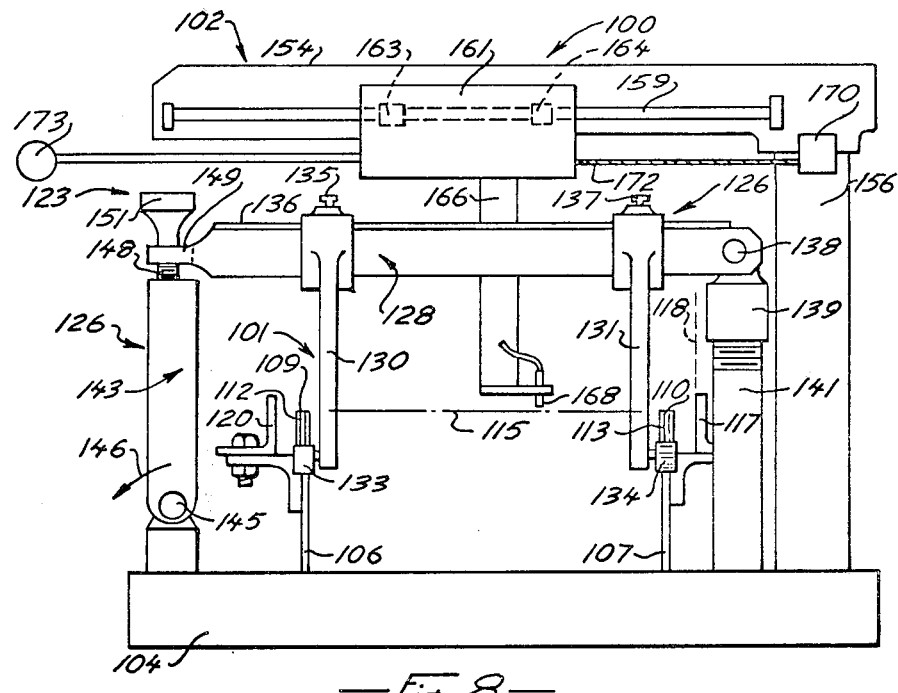
FIG. 8 is a simplified end elevation of the device of FIG. 7.

A portion of a single cut saw blade 10 has a front edge 11, having teeth 13 spaced by gullets 14. The saw has a face 12, a back edge 15, a central portion 16 and a longitudinal central axis 17. The central portion straddles the central axis and has boundaries shown by broken lines 18 and 19 spaced approximately equally from the central axis 17. Metal in the central portion has been expanded to produce a residual tensile stress at each edge of the saw and a residual compressive stress at the central potion. Degree of tensioning is generally greatest at the central axis 17 of the blaade, but sometimes metal adjacent the back edge 15 of a single cut saw is also tensioned to a lesser degree.

FIGS. 2 and 3

A roll tension monitor or gauging device 20 according to the invention has a forming means 22 having spaced former plates 24 and 25, the plates having transversely aligned convex upper edges 27 and 28 respectively to provide an accurate template of a known radius 33. The edges 27 and 28 are saw engaging surfaces adapted to contact a lower face of the saw over a selected length 23 of the saw in which roll tension is to be assessed. The edges have radii approximately equal to the radius in which the saw is to be curved longitudinally. The radius 33 is preferably of a similar order of magnitude as the radius of the bandmill wheels on which the saw runs.

Base members 30, 31 and 32 extend between the former plates as shown, the former plate 24, hereinafter a fixed support, being secured to the members adjacent outer ends thereof. A pair of spaced parallel guides, one only designated 35 being shown, extend from the the fixed plate 24 and pass through complementary bores (not shown) in the former plate 25. The plate 25 is moveable along the base members to vary spacing 29 between the plates 24 and 25 so as to accommodate saw blades of different widths. The former plate 25 is secured to the base by nut and bolt means 38 passing through elongated slots in the base members, one slot 37 only being shown.

Figure 7:
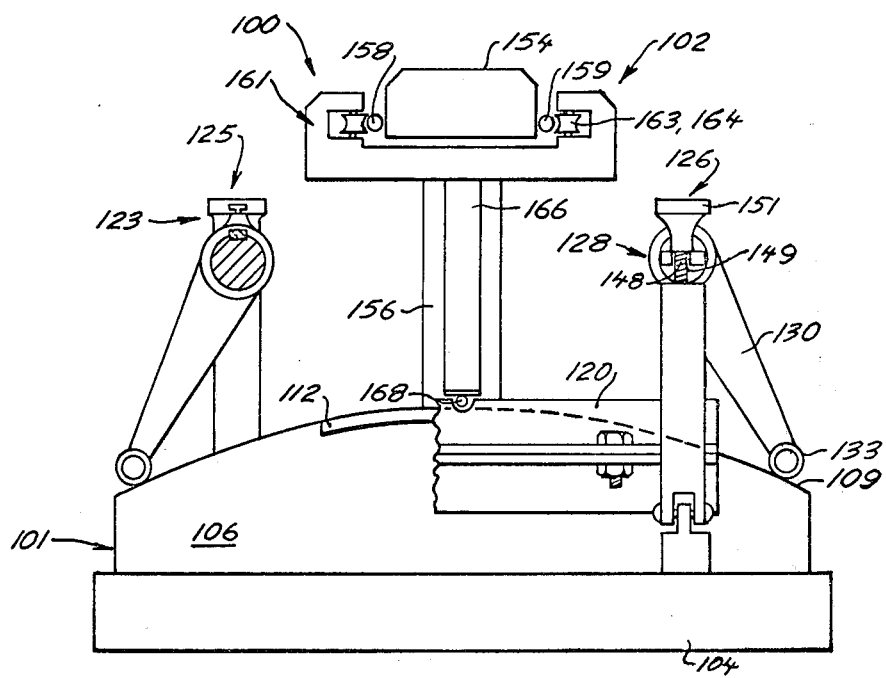
FIG. 7 is a simplified fragmented front elevation of an alternative device, some portions removed for clarity.

The upper edges 27 and 28 of the plates 24 and 25 have magnetic means 45 to serve as hold down means to retain selected length 23 of the saw blade 10 as shown in FIG. 3. The means 45 can be a plurality of individual magnets, or a pliable magnetic strip of rubber bonded barium ferrite composition. Additional hold down means are shown in FIG. 7 and can be used in conjunction with the magnetic means on the upper edges. Alternative elastic or spring straps or vacuum devices can be used as hold down means. Note that the saw blade is held down against the edges 27 and 28 so as to conform closely thereto for the whole length of the edges. The hold down means have sufficient force to overcome a tendency of the blade to spring off the edges. Edge guides 34 and 36 shown in broken line in FIG. 2 and best seen in FIG. 4, are secured to the former plates 24 and 25 respectively and cooperate with the edges 11 and 15 of the saw so as to locate the saw relative to the forming means to ensure that the longitudinal axis is parallel to the former plates. An inner face of the guide 34 is spaced laterally from the plate 24 to accommodate teeth of the saw which overhang the former plate, best seen in FIG. 4.

The base member 31 has two vertical posts 39 and 40 extending upwards from positions at opposite edges of the saw and adjacent ends of the base members 31. The posts are spaced outwards from the former plates 24 and 25 respectively sufficiently to accept a saw blade of maximum width therebetween. A horizontal carriage arm 42 extends between the posts and has one end 43 hinged to the post 40, and an opposite end 44 supported on a bracket 46 on the post 39. The arm 42 can be swung about the end 43 in direction of an arrow 41 to permit installation of a saw blade in the monitor. a slideway 48 is secured to one side of the arm and disposed so that an axis of the slideway is spaced equally from the edges 27 and 28. Adjustment means 49 cooperate with the arm and the bracket 46 and provide a fine adjustment for accurate setting of the slideway to position the slideway in a vertical plane.

The slideway 48 has a dovetail-sectioned groove 51 which cooperates with a complementary slide of a carriage 50 which is supported on and adapted to traverse the slideway. The groove serves as rail means to mount slidably the carriage for traversing across the width of the saw. A lead screw 52 extends parallel to the slideway and has one end coupled to a variable speed motor 54 and an opposite end journalled for rotation. The carriage has nut means (not shown) cooperating with the lead screw 52 so that rotation of the lead screw traverses the carriage along the slideway.

A linear transducer 56 serving as a sensor head is secured to the carriage 50 and has an output responsive to position of a portion of the face 12 as detected on a vertical axis 59 of the transducer, the axis being normal to direction of traverse of the carriage. The transducer 56 is hereinafter referred to as vertical transducer and is an electrical device which measures transverse curvature of the saw blade relative to a face datum line as will be described with reference to FIG. 4. The transducer 56 has a range of about 0.1 inches. A non-contact type of transducer is preferred, such as an eddy current or capacitance type, and is relatively unaffected by foreign matter on the saw. If a contact type of transducer is used, for example a linear potentiometer or a linear voltage differential transducer, the saw surface should be relatively clean.

A rotary transducer 61 mounted on the arm 42 has a pulley 63 serving as an input, and is coupled to the carriage 50 so as to have an output proportional to position of the carriage. Because the vertical transducer 56 is secured to the carriage, the output of the transducer 61 reflects position of the transducer 56 relative to a particular point, such point being termed an edge datum, for example the support 25. A second idler pulley 65 is provided at an opposite end of the slideway 48 remote from the pulley 63. A taut loop of wire 64 passes around the pulleys 63 and 65 and has opposite ends secured to the carriage 50. Thus the wire couples the carriage to the rotary transducer and the transducer reflects the position of the carriage and transducer relative to the edge datum. The transducer 61, hereinafter referred to as the position transducer or position means, is a rotary potentiometer which provides a DC voltage proportional to the distance moved by the carriage from the edge datum. Alternatively a conventional DC displacement transducer can be substituted. The position transducer has a range sufficient to accommodate a saw of maximum width, usually about twelve inches. Thus the arm 42, the posts 39 and 40 and carriage 50 and associated components serve as support means 62 for the transducers extending substantially across the width of the saw adjacent mid-position of the selected length.

FIG. 4

Roll tension in the saw causes the selected length of saw to be bowed transversely across the width thereof so that the face 12 of the saw has an upwardly bowed profile 66. Edges of the selected length of the saw are adjacent the edge guides 34 and 36 and contact the upper edges 27 and 28 of the former plates. A broken line extending normally between the edges 27 and 28 defines a face datum 67 and an inner face of the guide 36 adjacent the fixed plate 25 defines an edge datum 68. The saw is located relative to the data by the edge guides and plates, the face and edge data permitting determination of coordinates of the blade profile in vertical and horizontal planes respectively. At or adjacent the longitudinal axis 17 the bowed profile has a maximum displacement from the face datum 67, termed chord height 70.

As the carriage 52 is traversed along the arm 42, the transducer 56 is traversed along a horizontal axis 71 which is parallel to the face datum 67. The rotary transducer cooperating with the carriage has an output reflecting position of the carriage and thus the transducer 61 relates the transducer 56 to the edge datum 68. As the transducer 56 traverses across the saw it detects distance of the saw face relative to the face datum 67.

Thus the transducers 56 and 61 provide two electrical signals which together define position of a point on the saw face. The transducer 56 defines position relative to the face datum 67 and the transducer 61 defines position relative to the edge datum 68. The signals are used as inputs for an X–Y display. Thus the two transducers and the support means as above defined serve as sensing means cooperating with the face of the saw to detect at a position on the selected length of the saw spacing of the face 12 relative to the face datum and the edge datum. The transducer 56 thus cooperates with the support means and is adapted for generally transverse movement across the width of the saw at the mid position of the selected length 23.

FIGS. 5 and 6

The electrical outputs of the two transducers are fed to a coupling and display circuit 73. Output from the vertical transducer 56 is an electrical signal which is amplified in a vertical amplifier 74, the amplified output being fed to a vertical deflection yoke 75 of a cathode ray tube 76, having a display screen 77. Output from the rotary transducer 61, also an electrical signal, is fed to a horizontal amplifier 78, and then to a horizontal deflection yoke 79 of the cathode ray tube 76. The tube 76 has an oscillator 82 which normally produces an AC signal of approximately 15.75 KHz for operation in North America. The oscillator is connected to an output amplifier 83, including a high voltage transformer and a second deflection yoke which keeps the 15.75 KHz oscillator tuned. The signal from the output amplifier is fed to a high voltage rectifier 84 which produces a DC voltage level of approximately 15 KV which is applied to the tube 76. The display means is synchronized to display the saw profile as a trace 92 (broken line) on the screen, with reference to a horizontal X-axis corresponding to the face datum 67 and a vertical Y-axis corresponding to the edge datum 68. Intersection of the X and Y axes at an origin corresponds to intersection of of the edge datum with the face datum. Output from the transducer 56 reflects a vertical coordinate of the saw face relative to the face datum (X-axis) and is connected to the input for the Y-axis. Output from the transducer 61 reflects position of the transducer 56 thus reflecting a horizontal coordinate of the saw face relative to the edge datum (Y-Axis) and is connected to the input for the X-Axis. Thus the trace 92 on the screen reflects transverse curvature of the blade and this can be used for checking tensioning by comparing it with a desired curvature or profile. The display screen has a transparency support frame 86 serving as attachment means to accept a transparency 87, the transparency having a master trace showing a desired blade profile for that particular saw blade for comparison with the trace on the screen. Thus the display circuit 73 serves as a visual display means cooperating with the sensing means to provide a visual display of the profile of a portion of the selected length of the saw, so that distribution of residual stress in the saw can be assessed.

The transparency has a series of ideal or desired master profiles, severally 94 as shown in FIG. 6. The master profiles on the transparancy can be constructed from known formulae, with suitable adjustments for differences, if any, between radii 33 of the edges 27 and 28 of the supports 23 and 24 and radii of the wheels on which the saw is to be used. For supports having radii equal to the radius of the wheel, a typical chord height 70, in FIG. 4, (i.e. maximum displacement) for a 10 inch wide, 17 gauge saw is 0.0035 per foot of wheel diameter. Similarly for a 19 gauge saw the typical chord height is 0.004 inch per foot of wheel diameter. Some operators tension the saw so that the profile is symmetrical about the axis 17. More detailed explanation and construction of the above desired profile can be found in a paper entitled "Quality Control in the Timber Industry" by F.E. Allen, one of the inventors herein, which was published in September 1973 in the Australian Forest Industries Journal of Sydney, Australia. Other means of using the chord height value or profile obtained from the device according to the invention can be employed to improve distribution of the residual stress in roll tensioned bandsaws.

OPERATION

Referring to FIG. 2, the arm 42 is swung about the post 40 in direction of the arrow 41 to permit the saw to be fitted between the posts 39 and 40 on the plates 24 and 25. The saw assumes a position, as shown in FIG. 4 in which the boundaries 18 and 19 of the central portion of the saw are adjacent outer edges of the plates 24 and 25. Thus the teeth on the front edge 11 overhangs the plate 24 as shown, the back edge 15 being held against the guide 36.

The saw is retained in position on the supports as previously stated by the magnetic means on the edges 27 and 28. The device is adjusted so that both transducers are zeroed when the carriage is positioned at the beginning of its traverse, i.e. the transducer 56 is adjacent the back edge of the saw which corresponds to the origin on the X – Y graphical representation. The amplification factors of both amplifiers are adjusted to ensure than an optimum trace magnification is attained. For example, for a saw ten inches wide it may be desirable to have the horizontal scale full size, while the vertical scale can be amplified by a factor of ten to ten thousand to display a greatly magnified trace 92 of the curvature or profile as shown in FIG. 6.

The carriage 50 is traversed across the slideway 48, so that the transducer 56 tracks across a midposition of the selected length of the saw, that is at a station of the saw being assessed. The trace 92 obtained by combining the outputs from the two transducers is displayed on the screen 77 and compared with the desired profiles 94 on the transparency 87. Simple visual comparison indicates whether or not there is sufficient tensioning in the saw, and when this has been ascertained the tension distribution can be corrected if necessary. The maximum displacement of the saw face 12 occurs usually close to the central axis 17 as shown in FIG. 4, which displacement is represented on the trace as a dimension 95 which can be measured accurately due to the vertical amplification aforesaid. The saw is then fed for a few inches across the forming means and is then repositioned to assess stress distribution at a different station. Spacing between the stations can vary between 6 inches and 2 feet, depending on accuracy required within practical limits.

ALTERNATIVES AND EQUIVALENTS

Optional structure can be added to the device 20 of FIG. 1. Spaced limit switches (not shown) can be fitted adjacent opposite ends of the slideway 48 and are contacted when the carriage reaches ends of its stroke. The limit switches are coupled to the motor 54 to reverse direction of the screw 52 which repeats the track of the transducer 56 across the saw. This results in continuous forwards and backwards traverses of the transducer across the saw providing a continuous display of profile if desired. Alternative means of traversing a carriage are detailed with reference to FIG. 7 and 8.

The upper edges 27 and 28 of the plates of FIG. 2, are portions of an arc, disposed convex upwards so that the face 12 bows convex upwards. The plates can have arcuate edges disposed concave upwards, but this results in a downwards traverse bow of the saw. Further, curves other than radii can be used provided the selected length of the saw is deformed into a longitudinal curve of known geometry. a desired profile can be plotted on a transparency for almost any practical curve, the plotted profile serving as a master for comparing the actual trace with the theoretical desired trace. The cathode ray tube 76 is used to obtain a graphical representation of the combination of the transducer inputs. Other means of combining the inputs can be used, for example, the electrical signals may be used to drive commercialy available X–Y recorders, or cathode ray tubes in display monitors, or in modified television sets. Some devices can provide a permanent record of the saw blade profile, such as an X–Y recorder or a memory oscilloscope equipped with a camera.

Figs. 7 and 8

An alternative roll tension monitor or gauging device 100 has an alternative forming means 101 and an alternative support means 102, mounted on a base 104. The forming means has a pair of spaced former plates 106 and 107 having convex upper edges 109 and 110 serving as saw engaging surfaces for a selected length of saw to be assessed, the saw being omitted from FIGS. 7 and 8. Portions of the edges adjacent mid positions of the selected length have magnetic strips 112 and 113 to retain adjacent portions of the saw against the former plates. A broken line extending across the plates 106 and 107 defines face datum 115 of the device and an inner face of a guide 117 secured to the plate 107 defines an edge datum 118. A complementary guide 120 is adjustable latterly together with the former plate 106 to accommodate saws of different widths. The guides are shown spaced from the former plates to accommodate a double cut saw, and have slotted openings to accept bolts to permit easy adjustment.

An alternative hold down means 123 includes hold down roller mounts 125 and 126, one mount being provided adjacent opposite ends of the former plates. The mount 126 has a transverse arm 128 extending across and above the former plates and has a pair of spaced downwardly extending roller arms 130 and 131, the arms having lower ends. A roller 133 is journalled at the lower end of the arm 130, and a similar roller 134 is journalled at the lower end of the arm 131. The rollers are positioned so as to engage an upper face of the saw adjacent an edge thereof, so that a portion of the edge of the saw is sandwiched between a roller on the upper face, and the saw engaging surface on the lower face. The rollers have a width sufficiently narrow to have a negligible effect on the bowed profile of the saw face, ½ inch width has been found satisfactory.

The arms 130 and 131 extend rigidly from the transverse arm 128, a key 136 extending along the arm 128 being engaged in complementary key ways at the upper ends of the arms 130 and 131 to prevent rotation about the arm 128. Screws 135 and 137 lock arms 130 and 131 to the arm 128 to maintain relative positions. The arm 128 has an inner end having a hinge 138 mounted on an internally threaded cap 139. A vertical post 141 extends from the base and has an upper end threaded into the cap 139. A second post 143 spaced on an opposite side of the forming means from the post 141 has a lower end having a hinge 145 hinging the arm to the base for swinging about the base in direction of an arrow 146. The arm 143 has an upper end having a threaded stud 148 and an outer end of the arm 128 has a slot 149 to accept the stud as shown. A threaded knob 151 is screwed on the stud 148 and clamps the outer end of the arm 128 onto the post 143. The roller mount 125 is similar to the mount 126 so that by releasing the threaded knobs to swing down the second posts permits setting of the saw in the device and removal of the saw therefrom.

When a saw is fitted between the rollers and the forming means, force from the rollers applied to the saw is adjusted so that the saw is held snugly against the saw engaging surfaces by the rollers and magnetic forces in the strips 112 and 113. Downward force of the rollers is adjusted so that the rollers can be just turned by hand. The downward force from each roller is adjustable by vertical movement of the arm 128, essentially independent adjustment of the inner and outer ends being provided by the threaded cap 139 and the threaded nut 151 respectively. The roller mount 125 is similarly adjustable so that the saw is located against the forming means by four rollers at extreme limits of the forming means and the magnetic strips 112 and 113 adjacent mid positions of the former. The magnetic strips 112 and 113 hold mid-portions of the selected length of the saw thereagainst so as to reduce a tendency of the mid portions to disengage the saw engaging surface. Such hold down means permits easy feeding of the saw through the monitor without releasing the roller mounts. The saw can be fed by hand or by lightly applied tensioning rolls (not shown) drawing the saw through the monitor.

The alternative support means 102 has a horizontal carriage arm 154 extending transversely across and spaced above the saw, the arm being cantilevered from a vertical column 156 extending from the base. Parallel rails 158 and 159 are mounted on either side of the arm 154 and disposed parallel to the face datum 115. A carriage 161 has a pair of aligned rollers 163 and 164 (broken outline) engaging the rail 159 with a similar par of rollers engaging the rail 158. Thus the carriage is slideably mounted on the rails, so that the width of the saw can be traversed. A sensor arm 166 extends downwardly from the carriage and has a lower end carrying a transducer 168, which is generally equivalent to the transducer 56 (FIG. 2) and serves as the vertical transducer or sensor head.

A rotary transducer 170 is provided at an inner end of the arm 154 and has a flexible wire 172 extending therefrom to the carriage 161. Spring means (not shown) cooperate with the wire 172 and the transducer so that the wire remains taut as the carriage is traversed to and fro. Other means connecting the carriage and transducer can be used so as to function equivalently to the transducer 61 (FIG. 2).

Traversing of the carriage 161 actuates the rotary transducer to provide an output reflecting horizontal displacement of the sensor 168 from the edge datum and thus transducer 170 is position means equivalent to the transducer 61 of FIG. 2. Outputs from both transducers are fed to the display circuit 73 of FIG. 5 by means not shown. A handle 173 extends from the carriage and is gripped by an operator for forward and reverse traversing of the carriage across the saw. This permits rapid and easy placement of the sensor at a desired position so that an operator can quickly access the saw blade. This eliminates the powered lead screw 52 of FIG. 2. Thus the two transducers and support means as above defined serve as sensing means cooperating with the face of the saw and are equivalent to the sensing means of FIG. 2. We claim:

1. A device for indicating roll tension distribution in a saw blade the saw blade having: a longitudinal central axis extending along face of the saw, a cutting edge at a front edge thereof, a central portion straddling the central axis, and a back edge; metal in the central portion having been expanded to produce a residual tensile stress at each edge of the saw and a residual compressive stress at the central potion of the saw; the device including:
   i. forming means for holding a selected length of the saw in which roll tension is to be assessed, the length being deformed into a longitudinal curve of known geometry, roll tension in the saw causing the selected length of the saw to be bowed transversely across the width thereof so that the surface of the saw has a bowed profile, the forming means having a face datum and an edge datum, the selected length of the saw being located relative to the data,
   ii. sensing means adapted to cooperate with the face of the saw to detect, at a position on the selected length, the spacing of the face of the saw relative to the face datum and the edge datum,
   iii. visual display means cooperating with the sensing means to provide a visual display of saw profile at a position on the selected length of the saw,
so that distribution of residual stress in the saw can be assessed from the visual display.

2. A device as claimed in claim 1 in which the forming means includes:
   a. a former having a saw engaging surface, the saw engaging surface being adapted to contact the face of the saw over the selected length thereof, the engaging surface having a radius approximately equal to a radius in which the selected length of the saw is to be curved longitudinally,
   b. hold down means cooperating with the saw and the former to hold the selected length of the saw against the saw engaging surface,
so that the selected length of the saw is deformed so as to be curved longitudinally in a known radius.

3. A device as claimed in claim 2 in which:
   a. the former has a pair of spaced former plates, each plate having a curved upper edge serving as one saw engaging surface, the upper edges being disposed so as to be transversely aligned with each other and disposed normally to the face datum.

4. A device as claimed in claim 2 in which:
   a. the saw engaging surface of the former is convex upwards so that when the saw is held thereagainst the saw has a convex upper face,
and the hold down means includes a hold down roller mount provided adjacent opposite ends of the former, each roller mount having:
   b. a transverse arm extending across and spaced above the former,
   c. a pair of spaced, downwardly extending roller arms extending from the transverse arm, the arms having lower ends,
   d. a roller is journalled at each lower end of the roller arms, each roller being positioned so as to engage the face of the saw adjacent an edge thereof, so that an edge of the saw is sandwiched between a roller contacting the upper saw face, and the saw engaging surface contacting the lower saw face, the roller having a width sufficiently narrow to have a negligible effect on the bowed profile of the saw face.

5. A device as claimed in claim 4 in which the hold down means further includes:
   a. magnetic means provided adjacent a mid-portion of the saw engaging surface and adapted to hold mid position of the selected length of the saw thereagainst,
so as to reduce a tendency of mid position of the selected length of the saw to disengage the saw engaging surface.

6. A device as claimed in claim 1 in which the sensing means includes:
   a. support means extending substantially across the width of the saw and between ends of the selected length of the saw,
   b. a sensor head cooperating with the support means so that the sensor head is adapted for generally transverse movement across the width of the saw adjacent a mid position of the selected length and in a direction parallel to the face datum, the sensor head having an output responsive to the face of the saw so as to detect position of the face of the saw relative to the face datum,
   c. position means having an output reflecting position of the sensor head relative to the edge datum.

7. A device as claimed in claim 6 in which the support means includes:
   a. an arm extending transversely across the saw, the arm having rail means extending parallel to the face datum,
   b. a carriage slideably mounted on the rails of the arm so that the carriage can be traversed across the width of the saw,
and the device is further characterized by:
   c. the sensor head is mounted on the carriage so that as the carriage is traversed across the saw, the sensor head is disposed so as to detect a change of position of the face of the saw relative to the sensor head.

8. A device as claimed in claim 7 in which:
   a. the display means is adapted to display a profile of the saw with reference to a horizontal X-axis and vertical Y-axis, intersection of the X-axis and Y-axis at an origin corresponding to intersection of the edge datum with the face datum, the display means having inputs for the X-axis and Y-axis,
   b. the sensor head is an electrical linear transducer having an output connected electrically to the input for the Y-axis of the display means,
   c. the position means is a rotary transducer cooperating with the carriage to permit determination of a position of the linear transducer relative to the edge datum, the rotary transducer having an output connected electrically to the input of the X-axis of the display means, so that combining the outputs of the linear and rotary transducers in the display means provides a visual representation of the saw profile.

9. A device as claimed in claim 1 in which:
   a. the display means is adapted to display a trace of the saw with reference to a horizontal X-axis corresponding to the face datum and a vertical Y-axis corresponding to the edge datum, intersection of the X-axis and Y-axis at an origin corresponding to intersection of the edge datum with the face datum, the display means having inputs for the X-axis and Y-axis, and in which the sensing means includes:
   b. a sensor head adapted to traverse the saw, the sensor head having an output which reflects a vertical coordinate of the saw face relative to the face datum, the output being connected to the input of the Y-axis of the display means,
   c. a position means cooperating with the sensing means and having an output to reflect the position of the sensor head to reflect a horizontal coordinate of the saw face relative to the edge datum, the output thereof being connected to the input of the X-axis of the display means.

10. A device as claimed in claim 9 in which:
   a. the sensor head is an electrical transducer, the output thereof being an electrical signal reflecting position of the face of the saw relative to the transducer,
   b. the position means is an electrical transducer, the output thereof being an electrical signal reflecting position of the sensor head relative to the edge datum of the saw,
   c. the display means is a cathode ray tube having a display screen, and X-axis and Y-axis inputs connected to the outputs of the position means and the sensor head respectively, the cathode ray tube being synchronized so as to produce a trace of the blade profile of the screen,
   d. attachment means cooperating with the display screen to accept a master profile for comparison with the trace displayed on the screen.

* * * * *